(12) United States Patent
Bocquet et al.

(10) Patent No.: US 11,872,728 B2
(45) Date of Patent: Jan. 16, 2024

(54) VEGETABLE OIL AS FOAM STABILIZER IN PU BOOTS MANUFACTURING

(71) Applicant: BASF SE, Ludwigshafen am Rhein (DE)

(72) Inventors: David Bocquet, Paris (FR); Cristian Baravalle, Villanova d'Asti (IT); Marco Ortalda, Villanova d'Asti (IT)

(73) Assignee: BASF SE, Ludwigshafen am Rhein (DE)

( * ) Notice: Subject to any disclaimer, the term of this patent is extended or adjusted under 35 U.S.C. 154(b) by 527 days.

(21) Appl. No.: 16/755,381

(22) PCT Filed: Nov. 7, 2018

(86) PCT No.: PCT/EP2018/080461
§ 371 (c)(1),
(2) Date: Apr. 10, 2020

(87) PCT Pub. No.: WO2019/092011
PCT Pub. Date: May 16, 2019

(65) Prior Publication Data
US 2021/0197424 A1    Jul. 1, 2021

(30) Foreign Application Priority Data
Nov. 8, 2017 (EP) .................... 17200673

(51) Int. Cl.
| | |
|---|---|
| *C08G 18/10* | (2006.01) |
| *B29C 41/00* | (2006.01) |
| *B29C 41/36* | (2006.01) |
| *B29C 41/38* | (2006.01) |
| *C08G 18/20* | (2006.01) |
| *C08G 18/36* | (2006.01) |
| *C08K 5/00* | (2006.01) |
| *B29K 75/00* | (2006.01) |

(52) U.S. Cl.
CPC ............ *B29C 41/003* (2013.01); *B29C 41/36* (2013.01); *B29C 41/38* (2013.01); *C08G 18/10* (2013.01); *C08G 18/2081* (2013.01); *C08G 18/36* (2013.01); *C08K 5/005* (2013.01); *B29K 2075/00* (2013.01); *C08G 2120/00* (2013.01); *C08G 2410/00* (2013.01)

(58) Field of Classification Search
CPC ....... B29C 41/003; B29C 41/36; B29C 41/38; B29K 2075/00; C08G 18/10; C08G 18/2081; C08G 18/3206; C08G 18/36; C08G 18/4238; C08G 18/4241; C08G 18/7671; C08G 2120/00; C08G 2410/00; C08K 5/005
See application file for complete search history.

(56) References Cited

U.S. PATENT DOCUMENTS

| | | | |
|---|---|---|---|
| 4,581,387 | A | 4/1986 | Werner et al. |
| 4,764,537 | A | 8/1988 | Horn |
| 2009/0264547 | A1 | 10/2009 | Klesczewski et al. |
| 2011/0218258 | A1 | 9/2011 | Frericks et al. |
| 2013/0102697 | A1 | 4/2013 | Shinchi |

FOREIGN PATENT DOCUMENTS

| | | | | |
|---|---|---|---|---|
| CA | 1277471 | C | 12/1990 | |
| DE | 3607447 | A1 | 9/1987 | |
| EP | 0153639 | A2 | 9/1985 | |
| EP | 0250351 | A1 | 12/1987 | |
| WO | 2005098763 | A2 | 10/2005 | |
| WO | WO-2017154878 | A1 * | 9/2017 | ............. C08G 18/00 |

OTHER PUBLICATIONS

International Search Report for International Application No. PCT/EP2018/080461, dated Feb. 13, 2019, 3 pages.
Written Opinion of the International Searching Authority for International Application No. PCT/EP2018/080461, dated Feb. 13, 2019, 3 pages.
International Preliminary Report on Patentability for International Application No. PCT/EP2018/080461, dated Feb. 11, 2020, 5 pages.

* cited by examiner

*Primary Examiner* — John M Cooney
(74) *Attorney, Agent, or Firm* — Armstrong Teasdale LLP

(57) ABSTRACT

The present disclosure relates to a process for preparing polyurethane moldings, including the steps of providing a reaction mixture (M), including at least one polyisocyanate, and at least one component with two functional groups which are reactive towards isocyanates, introducing the reaction mixture (M) into a mold and allowing the reaction mixture (M) to react to form a polyurethane molding. In the first step, at least one additive selected from vegetable oils is added to the mixture (M). The present disclosure also relates to a polyurethane molding obtained or obtainable according to said process and the use of a polyurethane molding according to the invention as sole of a boot or part of a sole of a boot.

9 Claims, 2 Drawing Sheets

VEGETABLE OIL AS FOAM STABILIZER IN PU BOOTS MANUFACTURING

CROSS-REFERENCE TO RELATED APPLICATIONS

This application is a U.S. National Phase Application of PCT/EP2018/080461, filed Nov. 7, 2018, which claims the benefit of priority to EP Application No. 17200673.6, filed Nov. 8, 2017, the contents of which are hereby expressly incorporated by reference in their entirety.

The present invention relates to a process for preparing polyurethane moldings, comprising the steps of providing a reaction mixture (M), comprising at least one polyisocyanate, and at least one component with two functional groups which are reactive towards isocyanates, introducing the reaction mixture (M) into a mold and allowing the reaction mixture (M) to react to form a polyurethane molding, wherein in step (i), at least one additive selected from the group consisting of vegetable oils is added to the mixture (M). The present invention also relates to a polyurethane molding obtained or obtainable according to said process and the use of a polyurethane molding according to the invention as sole of a boot or part of a sole of a boot.

Waterproof footwear, such as boots, are used in outdoor recreational activities as well as in a number of industrial and professional uses. For example, waterproof boots are often used in hunting and fishing to ensure that the sportsman's feet remain dry during the recreational activity. Additionally, waterproof boots are used in the animal husbandry and farming environments, as well as many other professional environments.

One type of waterproof boots includes over-the-calf boots made entirely of rubber. Other conventional waterproof boots include an outer rubber waterproof layer over an inner layer of supporting material. The use of rubber as the waterproof material can provide a number of functional benefits, because rubber of sufficient thickness is strong, resilient, puncture resistant, and fairly durable. Such rubber boots, however, are typically inflexible, heavy, and do not fit the wearer's foot and/or leg very well.

Other waterproof boots have been developed that include a neoprene inner layer fully covered by an outer layer of rubber vulcanized onto the neoprene. This neoprene and vulcanized rubber construction provides a light weight boot that fits better and is more comfortable than the all-rubber boots. The manufacturing process of laying up the rubber and vulcanizing it onto the outside of the neoprene sock is a fairly laborious manufacturing process, which can increase the boot's manufacturing cost. The heat applied to the boot assembly during the vulcanization process can also have a negative effect on the inner neoprene sock. For example, the neoprene may be susceptible to taking a set and losing elasticity during the vulcanization process.

If the boots are prepared from different parts, the bonding between the parts often is not sufficient for the application in footwear.

Furthermore, processes for preparing moldings, in particular boots known in the state of the art involving the formation of a foam often result in a surface which has defects and the optical properties of the moldings are not sufficient for the preparation of boots or parts of boots.

Accordingly, there is a need for an improved light weight, waterproof boot and associated method of manufacture.

According to the present invention, this object is solved by a process for preparing polyurethane moldings, comprising the steps (i) providing a reaction mixture (M), comprising at least one polyisocyanate, and at least one component with two functional groups which are reactive towards isocyanates,
(ii) introducing the reaction mixture (M) into a mold;
(iii) allowing the reaction mixture (M) to react to form a polyurethane molding, wherein in step (i), at least one additive selected from the group consisting of vegetable oils is added to the mixture (M).

According to the present invention, the process comprises steps (i), (ii) and (iii). According to step (i), a reaction mixture (M), comprising at least one polyisocyanate, and at least one component with two functional groups which are reactive towards isocyanates is provided. The reaction mixture (M) is introduced into a mold according to step (ii) and then allowed to form a polyurethane molding according to step (iii). In step (i), at least one additive selected from the group consisting of vegetable oils is added to the mixture (M).

It has surprisingly been found that the addition of at least one additive selected from the group consisting of vegetable oils is added to the mixture (M) leads to improved smoothness of the surface of the moldings obtained and the bonding between two moldings can be significantly improved while the mechanical properties and other properties are not negatively affected.

According to the present invention, a wide range of vegetable oils can be used. Suitable are for example castor oil, olive oil, soybean oil, palm oil, coconut oil, canola oil, sunflower oil and grape oil, preferably castor oil, olive oil, soybean oil, and grape oil.

Therefore, according to a further embodiment, the present invention is also directed to a process as disclosed above, wherein the vegetable oil is selected from the group consisting of castor oil, olive oil, soybean oil, palm oil, coconut oil, canola oil, sunflower oil and grape oil.

Generally, the amount of the vegetable oil used can vary in wide ranges. Suitable amounts are for example in the range of from 0.1 to 10 wt % based on the weight of the reaction mixture (M), preferably in the range of from 0.5 to 5 wt % based on the weight of the reaction mixture (M), more preferably in the range of from 1.0 to 1.5 wt % based on the weight of the reaction mixture (M).

Therefore, according to a further embodiment, the present invention is also directed to a process as disclosed above, wherein the vegetable oil is added in an amount in the range of from 0.1 to 10 wt % based on the weight of the reaction mixture (M).

The reaction mixture (M) further comprises at least one polyisocyanate, and at least one component with two functional groups which are reactive towards isocyanates. According to the present invention, the reaction mixture can also comprise further components. Suitable components for preparing polyurethanes are in principle known. Additional components such as blowing agents, chain extenders, crosslinkers, catalysts and other auxiliaries and additives can be used according to the present invention.

Therefore, according to a further embodiment, the present invention is also directed to a process as disclosed above, wherein the reaction mixture comprises one or more components selected from the group of blowing agents, chain extenders, crosslinkers, catalysts and other auxiliaries and additives.

Furthermore, additives such as silicones or antistatic substances such as ammonium quaternary salts or ionic liquids can be used according to the present invention.

Suitable components for the process according to the present invention are in principle known from the state of the art.

Suitable polyisocyanates are for example aliphatic, cycloaliphatic and aromatic two- or polyfunctional isocyanates and also any desired mixtures thereof. Examples are monomeric methanediphenyl diisocyanate (MMDI), such as 4,4''-methanediphenyl diisocyanate, 2,4''-methanediphenyl diisocyanate, the mixtures of monomeric methanediphenyl diisocyanates and higher-nuclear homologs of methanediphenyl diisocyanate (polymeric MDI), naphthalene diisocyanate (NDI), especially 1,5-naphthalene diisocyanate, 3,3'-dimethyl-4,4'-diisocyanato-biphenyl (TODD, p-phenylene diisocyanate (PPDI), tetramethylene diisocyanate, hexamethylene diisocyanate (HDI), isophorone diisocyanate (IPDI), 2,4- or 2,6-tolylene diisocyanate (TDI) or mixtures thereof.

According to a further embodiment, the present invention is also directed to the process as disclosed above, wherein the polyisocyanate is selected from the group consisting of monomeric methanediphenyl diisocyanate (monomeric MDI), polymeric methanediphenyl diisocyanate (polymeric MDI), naphthalene diisocyanate (NDI), 3,3'-dimethyl-4,4'-diisocyanato-biphenyl (TODD, p-phenylene diisocyanate (PPDI), tetramethylene diisocyanate, hexamethylene diisocyanate (HDI), isophorone diisocyanate (IPDI), 2,4- or 2,6-tolylene diisocyanate (TDI) or mixtures thereof.

Preference is given to using NDI, mixtures of NDI and MDI or more preferably 4,4'-MDI. The more preferably used 4,4'-MDI may comprise from 0 to 20 wt % of 2,4'-MDI and small amounts, up to about 10 wt %, of allophanate- or uretoneimine-modified polyisocyanates. Small amounts of polyphenylene polymethylene polyisocyanate (polymer MDI) can also be used. The total amount of these high-functionality polyisocyanates should not exceed 5 wt %, based on the total weight of employed isocyanate.

Preferably, the polyisocyanate component is at least partly mixed in a first step with the at least one component with two functional groups which are reactive towards isocyanates and optionally crosslinking and/or chain-extending agents before the mixture is reacted at 50 to 120° C., preferably at 60 to 110° C. and more preferably 70 to 90° C. to give a prepolymer having isocyanate groups.

The resulting isocyanate-terminated prepolymer which may also be used according to the invention preferably has an NCO content of 10 to 25 wt %, more preferably 12 to 24 wt % and especially 14 to 23 wt %.

Therefore, according to a further embodiment, the present invention is also directed to the process as disclosed above, wherein the polyisocyanate is selected from the group consisting of isocyanate-terminated prepolymers of methanediphenyl diisocyanate having an NCO content of 10 to 25%.

Preferably, the isocyanate-terminated prepolymer is prepared using not less than 30 wt %, more preferably not less than 80 wt %, even more preferably not less than 90 wt % and especially 100 wt % of the at least one component with two functional groups which are reactive towards isocyanates.

Preferably, the isocyanate-terminated prepolymer is further prepared using not less than 50 wt %, more preferably not less than 80 wt %, even more preferably not less than 90 wt % and especially 100 wt % of the polyisocyanate.

Remaining isocyanate and remaining parts of the at least one component with two functional groups which are reactive towards isocyanates can then be used unchanged and/or in the form of conventional prepolymers for producing the polyurethane of the present invention.

The mixture (M) comprises at least one component with two functional groups which are reactive towards isocyanates. Suitable compounds are known to the person skilled in the art. Suitable are for example compounds with amino or alcohol groups. Preferred compounds in the context of the present invention are polyols.

Useful polyols include for example polyetherols or polyesterols having two or more isocyanate-reactive hydrogen atoms. Polyols preferably have a number-average molecular weight of above 450 g/mol, more preferably of above 500 to below 12000 g/mol and especially from 600 to 8000 g/mol.

Polyetherols are obtained by known processes, for example via anionic polymerization with alkali metal hydroxides or alkali metal alkoxides as catalysts and in the presence of at least one starter molecule comprising 2 to 3 reactive hydrogen atoms in bonded form, or via cationic polymerization with Lewis acids, such as antimony pentachloride or boron fluoride etherate formed from one or more alkylene oxides having 2 to 4 carbon atoms in the alkylene moiety. Suitable alkylene oxides are for example 1,3-propylene oxide, 1,2-butylene oxide, 2,3-butylene oxide and preferably ethylene oxide and 1,2-propylene oxide. Monomeric tetrahydrofuran can also be used. Useful catalysts further include multimetal cyanide compounds, so-called DMC catalysts. The alkylene oxides can be used singly, alternatingly in succession or as mixtures. Preference is given to using pure 1,2-propylene oxide or mixtures of 1,2-propylene oxide and ethylene oxide, wherein the ethylene oxide is used in amounts of above 0 to 50% as ethylene oxide end block ("EO-cap"), so the resulting polyols have primary OH end groups to an extent above 70%.

The polyether polyols, preferably polyoxypropylene polyols or polyoxypropylene-polyoxyethylene polyols, preferably have an average functionality of 1.7 to 3 and number-average molecular weights of 1000 to 12000, preferably of 1200 to 8000 g/mol, especially from 1500 to 6000 g/mol and even more preferably in the range from 2000 to 6000 g/mol.

Polyester polyols are obtainable for example from organic dicarboxylic acids having 2 to 12 carbon atoms, preferably aliphatic dicarboxylic acids having 4 to 6 carbon atoms and polyhydric alcohols, preferably diols, having 2 to 12 carbon atoms, preferably 2 to 6 carbon atoms. Useful dicarboxylic acids include for example: succinic acid, glutaric acid, adipic acid, pimelic acid, suberic acid, azelaic acid, sebacic acid, decanedicarboxylic acid, maleic acid, fumaric acid, phthalic acid, isophthalic acid and terephthalic acid. The dicarboxylic acids can be used not only individually but also mixed with each or one another. Instead of the free dicarboxylic acids, it is also possible to use the corresponding dicarboxylic acid derivatives, for example dicarboxylic esters of alcohols having 1 to 4 carbon atoms or dicarboxylic anhydrides. Preference is given to using dicarboxylic acid mixtures comprising succinic, glutaric and adipic acids in mixing ratios of, for example, from 20 to 35:35 to 50:20 to 32 parts by weight, and especially adipic acid. Examples of di- and polyhydric alcohols, especially diols, are: ethanediol, diethylene glycol, 1,2-propanediol, 1,3-propanediol, dipropylene glycol, 2-methyl-1,3-propanediol, 1,4-butanediol, 2-methyl-1,4-butanediol, 1,5-pentanediol, 3-methyl-1,5-pentanediol, 1,6-hexanediol, 1,10-decanediol, glycerol and trimethylolpropane. Preference is given to using ethanediol, diethylene glycol, 2-methyl-1,3-propanediol, 1,4-butanediol, 1,5-pentanediol and 1,6-hexanediol. The diols can be used not only individually but also mixed with each or one another. Preference is given to using a mixture of ethanediol and 1,4-butanediol. It is also possible to use polyester polyols formed from lactones, e.g., E-caprolactone or hydroxy carboxylic acids, e.g., .omega.-hydroxycaproic acid.

To prepare the polyester polyols, the organic, for example aromatic and preferably aliphatic, polycarboxylic acids and/or derivatives and polyhydric alcohols can be polycondensed in the absence of catalysts or preferably in the presence of esterification catalysts, advantageously in an atmosphere of inert gas, for example nitrogen, carbon monoxide, helium or argon, in the melt at temperatures of 150 to 250° C., preferably 180 to 220° C., optionally under reduced pressure, to the desired acid number, which is preferably less than 10 and more preferably less than 2. In a preferred embodiment, the esterification mixture is polycondensed at the abovementioned temperatures to an acid number of 80 to 30, preferably 40 to 30, under atmospheric pressure and then under a pressure of less than 500 mbar, preferably 50 to 150 mbar. Useful esterification catalysts include for example iron, cadmium, cobalt, lead, zinc, antimony, magnesium, titanium and tin catalysts in the form of metals, metal oxides or metal salts. However, the polycondensation can also be carried out in the liquid phase in the presence of diluting and/or entraining agents, for example benzene, toluene, xylene or chlorobenzene in order to distill off the water of condensation azeotropically. To prepare the polyester polyols, the organic polycarboxylic acids and/or derivatives and polyhydric alcohols are advantageously polycondensed in a molar ratio of from 1:1 to 1.8 and preferably from 1:1.05 to 1.2.

The polyester polyols preferably have a functionality of 1.9 to 4, more preferably 1.9 to 3, even more preferably of 1.9 to 2.2 and especially of 2.0 to 2.1, and a number-average molecular weight of 480 to 3500, preferably 1000 to 3500 g/mol and more preferably of 1500 to 3000 g/mol. More particularly, the polyesterols used are exclusively obtained by condensation of diacids and diols.

Useful polyols further include hydroxyl-containing polyesters of carbonic acid with the polyhydric alcohols mentioned, especially those having 4 to 8 carbon atoms, such as monoethylen glycol, diethylene glycol, 1,4-butanediol, 1,5-pentanediol, 1,6-hexanediol, 1,4-cyclohexanedimethanol, neopentylglycol, 2-methyl-1,3-propanediol, 2-methyl-1,4-butanediol, 2-butyl-2-ethyl-1,3-propanediol, condensation products of hydroxy carboxylic acids, for example omega-hydroxycaproic acid and preferably polymerization products of lactones, for example optionally substituted E-caprolactones.

According to a further embodiment, the present invention is directed to a process as disclosed above, wherein the component with two functional groups which are reactive towards isocyanates is a polyesterol.

Preferably, a mixture of polyesterols is used according to the present invention. Suitable polyesterols are for example linear or slightly branched polyesterols from adipic acid and/or dicarboxylic acids selected from succinic, glutaric, sebacic, phthalic anhydride, isophthalic, terephthalic and glycols such as monoethylene glycol, diethylene glycol, 1,4-butandiol, 1,5-pentandiol and 1,6-hexandiol and optionally small quantity of trifunctional alcohol such as glycerin or trimethylolpropane. Preferably, the polyesterol is a linear or slightly branched polyesterols from adipic acid and glycols such as monoethylene glycol, diethylene glycol, and 1,4-butandiol. Preferably, the molecular weight of the polyesterols used is in the range of from 500 to 3500 g/mol. Preferably, the OH functionality of the polyesterols used is in the range of from 2 to 2.6.

According to a further embodiment, the present invention is directed to a process as disclosed above, wherein the component with two functional groups which are reactive towards isocyanates is a polyester obtainable by condensation of dicarboxylic acids having from 4 to 10 carbon atoms with at least one bifunctional and/or trifunctional alcohol.

Useful polyols further may include polymer-modified polyols, preferably polymer-modified polyesterols or polyetherols, more preferably graft polyetherols or graft polyesterols, especially graft polyetherols. What is concerned here is a so-called polymer polyol, which typically contains polymers, preferably thermoplastic polymers, at 5 to 60 wt %, preferably 10 to 55 wt %, more preferably 30 to 55 wt % and especially 40 to 50 wt %. These polymer polyesterols are described for example in WO 05/098763 A1 and EP-A-250 351 and are typically obtained by free-radical polymerization of suitable olefinic monomers, for example styrene, acrylonitrile, (meth)acrylates, (meth)acrylic acid and/or acrylamide, in a polyesterol as grafting base. The side chains are generally formed as a result of free radicals transferring from growing polymer chains to polyesterols or polyetherols. The polymer polyol in addition to the graft copolymer comprises, predominantly, the homopolymers of the olefins, dispersed in unmodified polyesterol or, respectively, polyetherol.

Mixtures comprising polyesterols are preferably used according to the present invention. The proportion of polyols which is attributable in this case to polyesterols is preferably not less than 30 wt %, more preferably not less than 70 wt % and, more particularly, it is polyesterol which is exclusively used as higher molecular weight compound, in which case a polymer polyol based on polyesterol is treated like a polyesterol in this calculation.

Preferably, polyurethane moldings according to the present invention are further produced in the presence of blowing agents. These blowing agents may comprise water. Useful blowing agents in addition to water also include well-known chemically and/or physically acting compounds. Chemical blowing agents are compounds which react with isocyanate to give gaseous products, for example water or formic acid. Physical blowing agents are compounds which are in a dissolved or emulsified state in the polyurethane production feedstocks and vaporize under the conditions of polyurethane formation. They are for example hydrocarbons, halogenated hydrocarbons, and other compounds, for example perfluorinated alkanes, such as perfluorohexane, (hydro)chlorofluorocarbons, and ethers, esters, ketones, acetals or mixtures thereof, for example (cyclo) aliphatic hydrocarbons of 4 to 8 carbon atoms, or hydrofluorocarbons, such as Solkane® 365 mfc from Solvay Fluorides LLC. A preferred embodiment utilizes a blowing agent comprising a mixture comprising at least one of these blowing agents and water, more preferably no physical blowing agents and especially water as sole blowing agent.

The water content in a preferred embodiment is from 0.1 to 3 wt %, preferably from 0.4 to 2.0 wt % and more preferably from 0.6 to 1.5 wt %, based on the total weight of mixture (M).

In a further preferred embodiment, the reaction of components of mixture (M) is additionally admixed with microbeads containing physical blowing agent. The microbeads can also be used in admixture with the aforementioned blowing agents.

Useful crosslinking and/or chain-extending agents are substances having a molecular weight of preferably below 450 g/mol and more preferably in the range from 60 to 400 g/mol, chain extenders having 2 isocyanate-reactive hydrogen atoms and crosslinking agents having 3 or more isocyanate-reactive hydrogen atoms. These can preferably be used individually or in the form of mixtures. Preference is given to using diols and/or triols having molecular weights less than 400, more preferably from 60 to 300 and especially 60 to 150. Contemplated are for example aliphatic, cycloaliphatic and/or araliphatic diols having 2 to 14, preferably 2 to 10 carbon atoms, such as ethylene glycol, 1,3-propanediol, 1,10-decanediol, 1,2-, 1,3-, 1,4-dihydroxycyclohexane, diethylene glycol, dipropylene glycol and 1,4-butanediol, 1,6-hexanediol and bis(2-hydroxyethyl)hydroquinone, triols, such as 1,2,4-trihydroxycyclohexane, 1,3,5-trihydroxycyclohexane, glycerol and trimethylolpropane, and low molecular weight hydroxyl-containing polyalkylene oxides based on ethylene oxide and/or 1,2-propylene oxide and the aforementioned diols and/or triols as starter molecules. Particular preference is given to using monoethylene glycol, 1,4-butanediol, diethylene glycol, glycerol or mixtures thereof as chain extender, more preferred monoethylene glycol and 1,4-butanediol.

When chain-extending agents, crosslinking agents or mixtures thereof are used, these are advantageously used in amounts of 0.01 to 20 wt %, preferably 0.01 to 15 wt % and especially 0.01 to 5 wt %, based on the weight of weight of the components which are reactive towards the isocyanate groups.

Useful catalysts for producing the polyurethane moldings of the present invention are preferably compounds having a strongly accelerating effect on the reaction of polyols and optionally crosslinking and chain-extending agents and also chemical blowing agent with the organic, optionally modified polyisocyanates. Suitable examples are amidines, such as 2,3-dimethyl-3,4,5,6-tetrahydropyrimidine, tertiary amines, such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl) urea, dimethylpiperazine, N-methyl-N'-(dimethylaminomethyl)piperazine, N-methyl-N'-(dimethylaminoethyl)piperazine, N-methylimidazole, 1,2-dimethylimidazole, 1-azabicyclo[3.3.0]octane and preferably 1,4-diazabicyclo[2.2.2]octane and alkanolamine compounds, such as triethanolamine, triisopropanolamine, N-methyldiethanolamine, N-ethyldiethanolamine and dimethylethanolamine, or mixtures thereof. Also contemplated are organometallic compounds, preferably organotin compounds, such as tin(II) salts of organic carboxylic acids, e.g., tin(II) acetate, tin(II) octoate, tin(II) ethylhexoate and tin(II) laurate and the dialkyltin(IV) salts of organic carboxylic acids, e.g., dibutyl tin diacetate, dibutyltin dilaurate, dibutyltin maleate and dioctyltin diacetate, and also bismuth carboxylates, such as bismuth(III) neodecanoate, bismuth 2-ethylhexanoate and bismuth octanoate or mixtures thereof. The organometallic compounds can be used alone or preferably combined with strongly basic amines. According to the present invention, it is preferable to use exclusively amine catalysts.

According to a further embodiment, the present invention is thus directed to a process as disclosed above, wherein the catalyst is selected from the group consisting of amine catalysts. Preferably, no metallic catalyst is used.

According to a further embodiment, the present invention is also directed to a process as disclosed above, wherein the catalyst is selected from the group consisting of triethylamine, tributylamine, dimethylbenzylamine, N-methylmorpholine, N-ethylmorpholine, N-cyclohexylmorpholine, N,N,N',N'tetramethylethylenediamine, N,N,N',N'-tetramethylbutanediamine, N,N,N',N'-tetramethylhexanediamine, pentamethyldiethylenetriamine, bis(dimethylaminoethyl) ether, bis(dimethylaminopropyl) urea, dimethylpiperazine, 1,2-dimethylimidazole, 1-azabicyclo[3.3.0]octane, 1,4-diazabicyclo-[2.2.2]octane, 1,8-diazabicyclo[5.4.0]undec-7-ene (DBU) and mixtures of these tertiary amines.

It is preferable to use from 0.001 to 5 wt % and especially from 0.005 to 1 wt % of a catalyst or catalyst combination, based on the weight of polyols used. The catalysts are preferably selected and used in corresponding amounts such that the polyurethane molding of the present invention can be demolded after not more than 10 minutes, more preferably after 5 minutes and especially after not more than 3 minutes. This holds mutatis mutandis for moldlessly obtained material, for example material produced on endless belts. The indicated times relate to the time span between introducing the reaction mixture into the mold and defect-free demoldability of the polyurethane product.

The reaction mixture (M) of the present invention may optionally also include auxiliaries and/or additives. Examples are surface-active substances, foam stabilizers, cell regulators, further release agents, fillers, dyes, pigments, hydrolysis control agents, odor-absorbing substances and fungistatic and/or bacteriostatically acting substances.

Useful surface-active substances include for example compounds which serve to augment homogenization of starting materials and are possibly also suitable for regulating the cell structure. Examples are emulsifiers, such as the sodium salts of castor oil sulfates or of fatty acids, and also salts of fatty acids with amines, e.g., diethylamine oleate, diethanolamine stearate, diethanolamine ricinoleate, salts of sulfonic acids, for example alkali metal or ammonium salts of dodecylbenzene- or dinaphthylmethanedisulfonic acid, and ricinoleic acid; foam stabilizers, such as siloxane-oxalkylene interpolymers and other organopolysiloxanes, ethoxylated alkylphenols, ethoxylated fatty alcohols, paraffin oils, castor oil esters, or to be more precise ricinoleic esters, Turkey red oil and peanut oil, and cell regulators, such as paraffins, fatty alcohols and dimethylpolysiloxanes. To improve the emulsifying effect, the cell structure and/or stabilization of the foam it is further possible to use oligomeric acrylates having polyoxyalkylene and fluoroalkane moieties as side groups. The surface-active substances are typically used in amounts of 0.01 to 5 parts by weight, based on 100 parts by weight of the polyol used.

Useful further release agents include for example: reaction products of fatty acid esters with polyisocyanates, salts of amino-containing polysiloxanes and fatty acids, salts of saturated or unsaturated (cyclo)aliphatic carboxylic acids of 8 or more carbon atoms and tertiary amines and also, more particularly, inner release agents, such as carboxylic esters and/or amides prepared by esterifying or amidating a mixture of montanic acid and at least one aliphatic carboxylic acid of 10 or more carbon atoms with at least difunctional alkanolamines, polyols and/or polyamines having molecular weights of 60 to 400 g/mol, as disclosed in EP 153 639 A1 for example, mixtures of organic amines, metal salts of stearic acid and organic mono- and/or dicarboxylic acids or their anhydrides, as disclosed in DE-A-3 607 447 for example, or mixtures of an imino compound, the metal salt of a carboxylic acid and optionally a carboxylic acid, as disclosed in U.S. Pat. No. 4,764,537 for example. Preferably, reaction mixtures according to the present invention comprise no further release agents.

Useful fillers, especially reinforcing fillers, are the well-known, customary organic and inorganic fillers, reinforcing agents, weighting agents, coating agents, and so on. Specific examples are inorganic fillers, such as silicated minerals, for example sheet-silicates, such as antigorite, bentonite, serpentine, hornblends, amphiboles, chrisotile and talc, metal oxides, such as kaolin, aluminum oxides, titanium oxides, zinc oxide and iron oxides, metal salts such as chalk and barite, and inorganic pigments, such as cadmium sulfide, zinc sulfide and also glass and others. Preference is given to using kaolin (china clay), aluminum silicate and coprecipitates of barium sulfate and aluminum silicate. Useful organic fillers include for example carbon black, melamine, rosin, cyclopentadienyl resins and graft polymers and also cellulose fibers, polyamide fibers, polyacrylonitrile fibers, polyurethane fibers, polyester fibers based on aromatic and/or aliphatic dicarboxylic esters and especially carbon fibers.

The organic and inorganic fillers can be used individually or as mixtures and are advantageously added to the reaction mixture in amounts of 0.5 to 50 wt %, preferably 1 to 40 wt % based on the weight of the reaction mixture (M). Preferably, no fillers are used.

The present invention further provides a process for producing polyurethane moldings, which comprises reacting the prepolymer and also optionally further isocyanates with the isocyanate-reactive components in amounts such that the equivalence ratio of NCO groups to total reactive hydrogen atoms in this step is in the range from 0.8:1 to 1.5:1, preferably in the range from 1:1 to 1.3:1 and especially in the range from 1.02:1 to 1.15:1. A ratio of 1:1 corresponds to an isocyanate index of 100. Isocyanate index in the context of the present invention is to be understood as meaning the stoichiometric ratio of isocyanate groups to isocyanate-reactive groups, multiplied by 100. The isocyanate-reactive components and optionally (further components added in the second step are customarily termed "polyol component". The mixing ratios of isocyanate-terminated prepolymer to the polyol component are preferably 100 parts by weight: less than 200 parts by weight and more preferably 100 parts by weight:less than 150 parts by weight. This ratio of isocyanate-terminated prepolymer to polyol component can be set for example via the proportion of polyols and cross-linking and/or chain-extending agents in the polyol component or, respectively, in the isocyanate-terminated prepolymer.

The polyurethane moldings of the present invention are preferably produced by the two-shot process and low-pressure technology in closed, advantageously temperature-controlled molds. The molds usually consist of metal, for example aluminum or steel. These methods of operation are described for example by Piechota and Rohr in "Integralschaumstoff", Carl-Hanser-Verlag, Munich, Vienna, 1975, or in "Kunststoff-Handbuch", volume 7, Polyurethane, 3rd edition, 1993, chapter 7.

The isocyanate-terminated prepolymer and the polyol component are preferably mixed at a temperature of 25 to 60° C. for this. It is particularly preferable for the prepolymer and the polyol component to be mixed with each other at a temperature of 25 to 50° C. and 20 to 40° C. respectively. The reaction mixture is subsequently introduced into the mold, optionally under elevated pressure. Mixing can be effected mechanically using a stirrer or stirring screw. Mold temperature is advantageously in the range from 30 to 60° C., preferably in the range from 40 to 50° C. Reaction mixture in the context of the invention is the term given to the mixture of isocyanate-terminated prepolymers, blowing agents and the optionally included components at reaction conversions below 95%, based on the isocyanate groups of the prepolymer component. The amount of reaction mixture introduced into the mold is determined such that the article density of the polyurethane shoe sole according to the present invention is in the desired range.

The process according to the present invention leads to polyurethane moldings having outstanding mechanical properties and a high smoothness of the surface of the moldings obtained. More particularly, the polyurethane shoe soles of the present invention display high rebound resilience coupled with high hardness and low densities.

The polyurethane moldings of the present invention have a density in the range of from 300 to 950 g/l, preferably 350 to 750 g/l and especially in the range of from 400 to 700 g/l. This density of the polyurethane molding is to be understood as meaning the averaged density over the entire foam, i.e., in the case of integral foams, this refers to the average density of the entire foam including core and skin. Further materials besides the polyurethane of the present invention, in the case of hybrid shoe soles for example, are not included when the density is determined.

According to a further embodiment, the present invention therefore is directed to a polyurethane molding as disclosed above, wherein the polyurethane molding is an integral polyurethane foam having a density in the range of from 400 to 700 g/l.

The polyurethane moldings of the present invention may be used for a wide range of applications. They are particularly suitable for the application in the preparation of shoes or parts of a shoe, in particular boots or parts of a boot.

Therefore, the present invention is also directed to the use of a polyurethane molding according to the present invention as sole of a boot or part of a sole of a boot.

Polyurethane shoe soles or soles of a boot for the purposes of the present invention comprise one-part shoe soles, so-called combisoles, midsoles, insert soles or shoe sole parts, such as heel parts or ball parts. By insert soles are meant insert parts for the forefoot, insert parts for the whole foot or footbeds. Shoe soles within the meaning of the present invention further comprise polyurethane hybrid shoe soles which, in addition to the polyurethane of the present invention, comprise further materials, such as further polyurethanes and/or ethylene-vinyl acetate.

BRIEF DESCRIPTION OF THE FIGURES

FIG. 1(a) shows a picture of the boot obtained according to example 1, A1.

FIG. 1(b) shows a picture of the boot obtained according to example 1, A1/1.

FIG. 1(c) shows a picture of the boot obtained according to example 1, A1/2.

FIG. 2(a) shows a picture of the boot obtained according to example 2, B1.

FIG. 2(b) shows a picture of the boot obtained according to example 2, B1/1.

FIG. 2(c) shows a picture of the boot obtained according to example 2, B1/2.

The present invention includes the following embodiments, wherein these include the specific combinations of embodiments as indicated by the respective interdependencies defined therein. The present invention is further illustrated by the following embodiments and combinations of embodiments as indicated by the respective dependencies and back-references. In particular, it is noted that in each instance where a range of embodiments is mentioned, for example in the context of a term such as "The process of any one of embodiments 1 to 4", every embodiment in this range is meant to be explicitly disclosed for the skilled person, i.e. the wording of this term is to be understood by the skilled person as being synonymous to "The process of any one of embodiments 1, 2, 3, and 4".

1. A process for preparing polyurethane moldings, comprising the steps
   (i) providing a reaction mixture (M), comprising at least one polyisocyanate, and at least one component with two functional groups which are reactive towards isocyanates,
   (ii) introducing the reaction mixture (M) into a mold;
   (iii) allowing the reaction mixture (M) to react to form a polyurethane molding,
   wherein in step (i), at least one additive selected from the group consisting of vegetable oils is added to the mixture (M).
2. The process according to embodiment 1 wherein the vegetable oil is selected from the group consisting of castor oil, olive oil, soybean oil, palm oil, coconut oil, canola oil, sunflower oil and grape oil.
3. A process for preparing polyurethane moldings, comprising the steps
   (i) providing a reaction mixture (M), comprising at least one polyisocyanate, and at least one component with two functional groups which are reactive towards isocyanates,
   (ii) introducing the reaction mixture (M) into a mold;
   (iii) allowing the reaction mixture (M) to react to form a polyurethane molding,
   wherein in step (i), at least one additive selected from the group consisting of vegetable oils is added to the mixture (M),
   wherein the vegetable oil is selected from the group consisting of castor oil, olive oil, soybean oil, palm oil, coconut oil, canola oil, sunflower oil and grape oil.
4. The process according to any of embodiments 1 to 3, wherein the vegetable oil is added in an amount in the range of from 0.1 to 10 wt % based on the weight of the reaction mixture (M).
5. A process for preparing polyurethane moldings, comprising the steps
   (i) providing a reaction mixture (M), comprising at least one polyisocyanate, and at least one component with two functional groups which are reactive towards isocyanates,
   (ii) introducing the reaction mixture (M) into a mold;
   (iii) allowing the reaction mixture (M) to react to form a polyurethane molding,
   wherein in step (i), at least one additive selected from the group consisting of vegetable oils is added to the mixture (M),
   wherein the vegetable oil is selected from the group consisting of castor oil, olive oil, soybean oil, palm oil, coconut oil, canola oil, sunflower oil and grape oil, and
   wherein the vegetable oil is added in an amount in the range of from 0.1 to 10 wt % based on the weight of the reaction mixture (M).
6. The process according to any of embodiments 1 to 5, wherein the reaction mixture comprises one or more components selected from the group of blowing agents, chain extenders, crosslinkers, catalysts and other auxiliaries and additives.
7. The process according to any of embodiments 1 to 6, wherein the catalyst is selected from the group consisting of amine catalysts.
8. The process according to any of embodiments 1 to 7, wherein the catalyst is selected from the group consisting of triethylamine, tributylamine, dimethylbenzylamine, N-methylmorpholine, N-ethylmorpholine, N-cyclohexylmorpholine, N,N,N',N'tetramethylethylenediamine, N,N,N',N'-tetramethylbutanediamine, N,N,N',N'-tetramethylhexanediamine, pentamethyldiethylenetriamine, bis(dimethylaminoethyl) ether, bis(dimethylaminopropyl)urea, dimethylpiperazine, 1,2-dimethylimidazole, l-azabicyclo[3.3.0]octane, 1,4-diazabicyclo-[2.2.2]octane, 1,8-diazabicyclo[5.4.0]undec-7-ene (DBU) and mixtures of these tertiary amines.
9. The process according to any of embodiments 1 to 8, wherein the component with two functional groups which are reactive towards isocyanates is a polyesterol.
10. The process according to any of embodiments 1 to 9, wherein the component with two functional groups which are reactive towards isocyanates is a polyester obtainable by condensation of dicarboxylic acids having from 4 to 10 carbon atoms with at least one bifunctional and/or trifunctional alcohol.
11. The process according to any of embodiments 1 to 10, wherein the polyisocyanate is selected from the group consisting of monomeric methanediphenyl diisocyanate (monomeric MDI), polymeric methanediphenyl diisocyanate (polymeric MDI), naphthalene diisocyanate (NDI), 3,3'-dimethyl-4,4'-diisocyanato-biphenyl (TODD, p-phenylene diisocyanate (PPDI), tetramethylene diisocyanate, hexamethylene diisocyanate (HDI), isophorone diisocyanate (IPDI), 2,4- or 2,6-tolylene diisocyanate (TDI) or mixtures thereof.
12. The process according to any of embodiments 1 to 11, wherein the polyisocyanate is selected from the group consisting of isocyanate-terminated prepolymers of methanediphenyl diisocyanate having an NCO content of 10 to 25%.
13. A polyurethane molding obtained or obtainable according to a process according to any of embodiments 1 to 12.
14. A polyurethane molding obtained or obtainable according to a process for preparing polyurethane moldings, comprising the steps
   (i) providing a reaction mixture (M), comprising at least one polyisocyanate, and at least one component with two functional groups which are reactive towards isocyanates,
   (ii) introducing the reaction mixture (M) into a mold;
   (iii) allowing the reaction mixture (M) to react to form a polyurethane molding,
   wherein in step (i), at least one additive selected from the group consisting of vegetable oils is added to the mixture (M).
15. A polyurethane molding obtained or obtainable according to a process for preparing polyurethane moldings, comprising the steps (i) providing a reaction mixture (M), comprising at least one polyisocyanate, and at least one component with two functional groups which are reactive towards isocyanates,
(ii) introducing the reaction mixture (M) into a mold;
(iii) allowing the reaction mixture (M) to react to form a polyurethane molding,
wherein in step (i), at least one additive selected from the group consisting of vegetable oils is added to the mixture (M),
wherein the vegetable oil is selected from the group consisting of castor oil, olive oil, soybean oil, palm oil, coconut oil, canola oil, sunflower oil and grape oil.

16. A polyurethane molding obtained or obtainable according to a process for preparing polyurethane moldings, comprising the steps
(i) providing a reaction mixture (M), comprising at least one polyisocyanate, and at least one component with two functional groups which are reactive towards isocyanates,
(ii) introducing the reaction mixture (M) into a mold;
(iii) allowing the reaction mixture (M) to react to form a polyurethane molding,
wherein in step (i), at least one additive selected from the group consisting of vegetable oils is added to the mixture (M),
wherein the vegetable oil is selected from the group consisting of castor oil, olive oil, soybean oil, palm oil, coconut oil, canola oil, sunflower oil and grape oil, and
wherein the vegetable oil is added in an amount in the range of from 0.1 to 10 wt % based on the weight of the reaction mixture (M).

17. The polyurethane molding according to any of embodiments 13 to 16, wherein the polyurethane molding is an integral polyurethane foam having a density in the range of from 400 to 700 g/l.

18. The use of a polyurethane molding according to embodiment 13 as sole of a boot or part of a sole of a boot.

19. The use of a polyurethane molding according to embodiment 14 as sole of a boot or part of a sole of a boot.

20. The use of a polyurethane molding according to embodiment 15 as sole of a boot or part of a sole of a boot.

21. The use of a polyurethane molding according to embodiment 16 as sole of a boot or part of a sole of a boot.

Examples will be used below to illustrate the invention.

EXAMPLES

1. General Description (a) Process for Preparing the Boots

The process is carried out by means of a low pressure injection machine Desma, specifically designed to produce boots. The machine is provided of one mould carrier to produce a single boot: aluminum mould, right, size 44. At first a sock liner made with a PU coated fabric is placed in the leg mould, and the leg PU is injected. After a certain period of time, named "opening time leg", the mould is opened and the sole's mould is placed with a pneumatic device; the sole PU is injected. After a certain period of time, named "opening time sole", the sole's mould is opened and the entire boot is removed from the mould. The total cycle time is intended as sum of the opening time leg and the opening time sole.

The adhesion of the sole and the leg (bonding) is therefore spontaneous; no binder is used.

The process parameters are following:
Mould temperature: leg: 50-60° C.; side rings: 40-50° C.
Component A (polyol) temperature: 45-50° C.
Component B (isocyanate prepolymer) temperature: 40-45° C.
Output: leg=55-65 g/sec; sole=40-50 g/sec
Opening time sole; 2.5 min; Opening time leg: 3.25 min. or 7'. Total cycle time: 5.75 min or 9.5 min respectively.

In this experimentation two different opening time of the leg part are used: 3.25' and 7'. The 3.25" opening time of the leg is conform to the processing conditions in a massive boots products; the 7' opening time of the leg simulates an unexpected temporary stop of the injection machine during the production route. The bonding sole-leg is greatly influenced by the opening time of the leg: higher is this time, lower is the bonding.

(b) Final Test on Boots:
1. Visual inspection of the boot (presence of air bubbles in the top leg and/or in the flash area, close to the junction between leg and sole).
2. Determination of the mould density of the leg, according to ISO 845:2006: several specimens are cut in different areas of the leg, the density of each of them is measured and an average value is calculated.
3. Determination of the interlayer bond strength (peel strength sole-leg), according to ISO20344:2011, 5.2, after two different opening time: 3.25' and 7'. According to the ISO20345:2007, in which the minimum requirements for the personal protective equipment (including the safety boots) are listed, the peel strength sole-leg shall be not less than 4.0 N/mm unless there is tearing of any part of the sole, in which case the bond strength shall be not less than 3.0 N/mm.

In the following tables, all values out of this range are marked in red and bold.

2. Example 1

The formulation of the A Component (polyol component) is summarized in table 1:

TABLE 1

| Test | A1 | A1/1 | A1/2 |
|---|---|---|---|
| PESOL I (*) | 93.34 | 91.75 | 92.78 |
| Monoethylenglycol | 4.48 | 4.48 | 4.48 |
| Dabco EG (**) | 1.24 | 1.24 | 1.24 |
| Glycerine | 0.5 | 0.5 | 0.5 |
| Water | 0.44 | 0.44 | 0.44 |
| Dabco DC193 (***) | 0 | 0 | 0.56 |
| Castor oil | 0 | 1.59 | 0 |
|  | 100 | 100 | 100 |
| B Component: IP A:B | 100:74 | 100:73 | 100:73 |

The formulation of the B component (isocyanate prepolymer, IP) is summarized in table 2:

TABLE 2

| IP | |
|---|---|
| 4.4' MDI | 52.2 |
| Lupranat MM103 (****) | 5 |
| PESOL II (*****) | 35.8 |
| Mesamoll | 7 |
| | 100 |
| NCO content = 18% | |

The results of the testing of the boots are summarized in table 3.

TABLE 3

Figure 1:
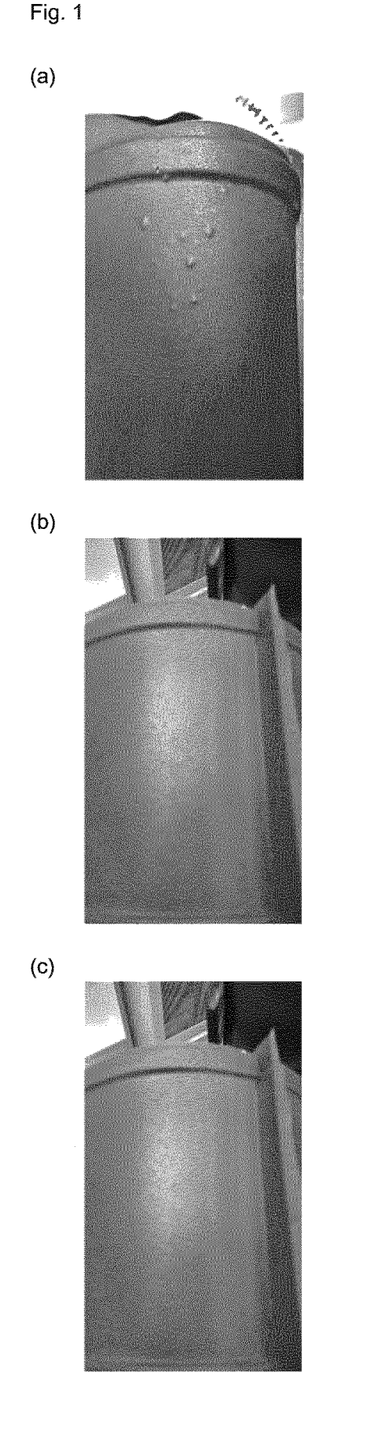
FIG. 1 shows a picture taken of the boot to represent the results of the visual inspection for the presence of air bubbles in the top leg.

| Test | A1 | A1/1 | A1/2 |
|---|---|---|---|
| Top leg's picture | FIG. 1a | FIG. 1b | FIG. 1c |
| Mould density leg/g/cm$^3$) | 0.66 | 0.66 | 0.66 |
| Peel strength sole-leg (N/mm) at 3.25' min opening time | 2.96 | 4.9 | 3.15 |
| Peel strength sole-leg (N/mm) At 7' opening time | 2.18 | 3.76 | 1.77 |

(*) Branced polyadipate based on monoethylenglycol and diethylenglycol, MW 2150
(**) 33% triethylendiamine, 67% monoethylenglycol
(***) Copolymer polydimethylsiloxane-polyethylenglycol
(****) uretonimin-modified 4,4'-MDI
(*****) linear polyadipate based on monoethylenglycol and diethylenglycol, MW 3000

3. Example 2

The formulation of the A Component (polyol component) is summarized in table 4.

TABLE 4

| Test | B1 | B1/1 | B1/2 |
|---|---|---|---|
| PESOL I (*) | 93.34 | 91.75 | 92.78 |
| Monoethylenglykol | 4.48 | 4.48 | 4.48 |
| Dabco EG (**) | 1.24 | 1.24 | 1.24 |
| Glycerine | 0.5 | 0.5 | 0.5 |
| Water | 0.44 | 0.44 | 0.44 |
| Dabco DC193 (***) | 0 | 0 | 0.56 |
| Soja oil | 0 | 1.59 | 0 |
| | 100 | 100 | 100 |
| B Component: IP A:B | 100:74 | 100:73 | 100:73 |

The formulation of the B component (isocyanate prepolymer, IP) is summarized in table 5.

TABLE 5

| IP | |
|---|---|
| 4.4' MDI | 52.2 |
| Lupranat MM103 (****) | 5 |
| PESOL II (*****) | 35.8 |

TABLE 5-continued

| IP | |
|---|---|
| Mesamoll | 7 |
| | 100 |
| NCO content = 18% | |

The results of the testing of the boots are summarized in table 6.

TABLE 6

Figure 2:
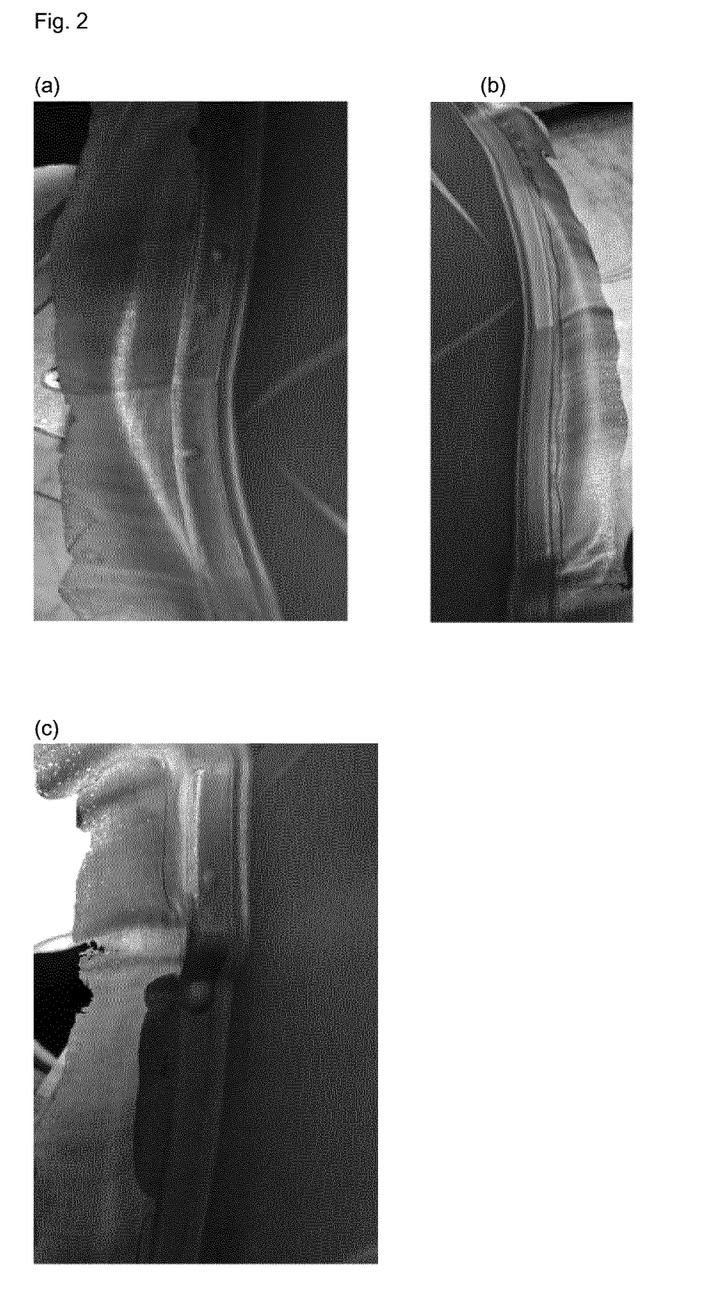
FIG. 2 shows a picture taken of the boot to represent the results of the visual inspection for the presence of air bubbles in the flash area, close to the junction between leg and sole.

| Test | B1 | B1/1 | B1/2 |
|---|---|---|---|
| Flash area picture | FIG. 2a | FIG. 2b | FIG. 2c |
| Mould density leg/g/cm$^3$) | 0.66 | 0.66 | 0.66 |
| Peel strength sole-leg (N/mm) at 3.25' min opening time | 2.1 | 4.5 | 3.26 |
| Peel strength sole-leg (N/mm) At 7' opening time | 1.87 | 3.9 | 1.54 |

(*) Branced polyadipate based on monoethylenglykol and diethylenglycol, MW 2150
(**) 33% triethylendiamine, 67% monoethylenglycol
(***) Copolymer polydimethylsiloxane-polyethylenglycol
(****) uretonimin-modified 4,4'-MDI
(*****) linear polyadipate based on monoethylenglycol and diethylenglycol, MW 3000

LITERATURE CITED

WO 05/098763 A1
EP 250 351 A1
EP 153 639 A1
DE 3 607 447 A1
U.S. Pat. No. 4,764,537
Piechota and Rohr in "Integralschaumstoff", Carl-Hanser-Verlag, Munich, Vienna, 1975 "Kunststoff-Handbuch", volume 7, Polyurethane, 3rd edition, 1993, chapter 7

The invention claimed is:

1. A process for preparing polyurethane moldings, comprising the steps
   (i) providing a reaction mixture (M), comprising at least one polyisocyanate, and at least one component with two functional groups which are reactive towards isocyanates,
   (ii) introducing the reaction mixture (M) into a mold; and
   (iii) allowing the reaction mixture (M) to react to form a polyurethane molding,
   wherein in step (i), at least one additive selected from the group consisting of vegetable oils is added to the mixture (M),
   wherein the vegetable oil is added in an amount in the range of from 0.5 to 5 wt % based on the weight of the reaction mixture (M);
   wherein the vegetable oil is selected from the group consisting of castor oil, olive oil, soybean oil, palm oil, coconut oil, canola oil, sunflower oil and grape oil; and
   wherein the polyurethane molding is an integral polyurethane foam having a density in a range of from 400 to 700 g/l.

2. The process according to claim 1, wherein the reaction mixture (M) comprises one or more components selected from the group consisting of blowing agents, chain extenders, crosslinkers, catalysts and other auxiliaries and additives.

3. The process according to claim 2, wherein the catalyst is selected from the group consisting of amine catalysts.

4. The process according to claim 3, wherein the catalyst is selected from the group consisting of triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, bis(dimethylaminoethyl) ether, bis(dimethylaminopropyl)urea, dimethylpiperazine, 1,2-dimethylimidazole, 1-azabicyclo[3.3.0]octane, 1,4-diazabicyclo-[2.2.2]octane, 1,8-diazabicyclo[5.4.0]undec-7-ene (DBU) and mixtures of these tertiary amines.

5. The process according to claim 1, wherein the component with two functional groups which are reactive towards isocyanates is a polyesterol.

6. The process according to claim 1, wherein the component with two functional groups which are reactive towards isocyanates is a polyester obtainable by condensation of dicarboxylic acids having from 4 to 10 carbon atoms with at least one bifunctional and/or trifunctional alcohol.

7. The process according to claim 1, wherein the polyisocyanate is selected from the group consisting of monomeric methanediphenyl diisocyanate (monomeric MDI), polymeric methanediphenyl diisocyanate (polymeric MDI), naphthalene diisocyanate (NDI), 3,3'-dimethyl-4,4'-diisocyanato-biphenyl (TODI), p-phenylene diisocyanate (PPDI), tetramethylene diisocyanate, hexamethylene diisocyanate (HDI), isophorone diisocyanate (IPDI), 2,4- or 2,6-tolylene diisocyanate (TDI) or mixtures thereof.

8. The process according to claim 1, wherein the polyisocyanate is selected from the group consisting of isocyanate-terminated prepolymers of methanediphenyl diisocyanate having an NCO content of 10 to 25%.

9. The process of claim 1, wherein the polyurethane molding is a sole of a boot or a part of a sole of a boot.

\* \* \* \* \*